US010556973B2

(12) United States Patent
Hu et al.

(10) Patent No.: US 10,556,973 B2
(45) Date of Patent: Feb. 11, 2020

(54) METHOD FOR THE PREPARATION OF NITRATED STYRENIC FLUOROPOLYMERS

(71) Applicant: Akron Polymer Systems, Inc., Akron, OH (US)

(72) Inventors: Lang Hu, Akron, OH (US); Liu Deng, Kingsport, TN (US); Wentao Li, Kingsport, TN (US); Robert Sharpe, Johnson City, TN (US); Eduardo Cervo, Kingsport, TN (US); Thauming Kuo, Kingsport, TN (US); Bin Wang, Kingsport, TN (US); Alan Phillips, Johnson City, TN (US); Xiaoliang Zheng, Hudson, OH (US); Peiyao Wang, Akron, OH (US); Dong Zhang, Uniontown, OH (US); Frank Harris, Boca Raton, FL (US); Ted Germroth, Kingsport, TN (US)

(73) Assignee: Akron Polymer Systems, Inc., Akron, OH (US)

(*) Notice: Subject to any disclaimer, the term of this patent is extended or adjusted under 35 U.S.C. 154(b) by 84 days.

(21) Appl. No.: 15/675,268

(22) Filed: Aug. 11, 2017

(65) Prior Publication Data

US 2018/0044447 A1 Feb. 15, 2018

Related U.S. Application Data

(60) Provisional application No. 62/374,242, filed on Aug. 12, 2016, provisional application No. 62/374,247, filed on Aug. 12, 2016.

(51) Int. Cl.
| | |
|---|---|
| *C08F 12/26* | (2006.01) |
| *C08F 2/02* | (2006.01) |
| *C08F 2/04* | (2006.01) |
| *C08F 2/18* | (2006.01) |
| *C08F 2/22* | (2006.01) |
| *C08F 8/30* | (2006.01) |
| *C08F 12/08* | (2006.01) |
| *C08F 12/20* | (2006.01) |

(52) U.S. Cl.
CPC .............. *C08F 12/26* (2013.01); *C08F 2/02* (2013.01); *C08F 2/04* (2013.01); *C08F 2/18* (2013.01); *C08F 2/22* (2013.01); *C08F 8/30* (2013.01); *C08F 12/08* (2013.01); *C08F 12/20* (2013.01)

(58) Field of Classification Search
CPC .......... C08F 12/26; C08F 12/08; C08F 12/20; C08F 8/30
See application file for complete search history.

(56) References Cited

U.S. PATENT DOCUMENTS

| | | | |
|---|---|---|---|
| 3,573,253 A | 3/1971 | Gray | |
| 6,049,419 A | 4/2000 | Wheatley et al. | |
| 6,069,278 A | 5/2000 | Chuang | |
| 7,737,308 B1 | 6/2010 | Straessler | |
| 7,848,020 B2 | 12/2010 | Hendrix et al. | |
| 8,304,079 B2 | 11/2012 | Germroth et al. | |
| 8,545,970 B2 | 10/2013 | Doi et al. | |
| 8,802,238 B2 | 8/2014 | Zheng et al. | |
| 8,889,043 B2 | 11/2014 | Wang et al. | |
| 9,096,719 B2 | 8/2015 | Zhang et al. | |
| 9,234,987 B2 | 1/2016 | Wang et al. | |
| 10,125,250 B2 | 11/2018 | Zheng et al. | |
| 10,126,479 B2 | 11/2018 | Wang et al. | |
| 2003/0212243 A1 | 11/2003 | Hergenrother et al. | |
| 2006/0141219 A1 | 6/2006 | Benson et al. | |
| 2008/0239491 A1 | 10/2008 | Zheng et al. | |
| 2008/0241565 A1 | 10/2008 | Germroth et al. | |
| 2011/0076487 A1* | 3/2011 | Zheng .................. | C08J 5/18 428/336 |
| 2012/0113338 A1 | 5/2012 | Saigusa et al. | |
| 2013/0279126 A1 | 10/2013 | Chen et al. | |
| 2014/0126055 A1 | 5/2014 | Wang et al. | |
| 2014/0205822 A1 | 7/2014 | Wang et al. | |
| 2016/0215132 A1 | 7/2016 | Zheng et al. | |
| 2018/0044444 A1 | 2/2018 | Zhang et al. | |
| 2018/0044447 A1 | 2/2018 | Hu et al. | |
| 2018/0052271 A1 | 2/2018 | Wang et al. | |
| 2018/0072882 A1 | 3/2018 | Zheng et al. | |

FOREIGN PATENT DOCUMENTS

| | | |
|---|---|---|
| CN | 105037602 A | 11/2015 |
| EP | 2060937 A1 | 5/2009 |
| JP | 2010077318 A | 4/2010 |
| JP | 2011102868 A | 5/2011 |
| KR | 10-2015-0037443 A | 4/2015 |
| WO | 2016118873 A1 | 7/2016 |
| WO | 2018031853 A1 | 2/2018 |
| WO | 2018031880 A1 | 2/2018 |
| WO | 2018031886 A1 | 2/2018 |

OTHER PUBLICATIONS

Lu, Journal of Functional Polymers, Jun. 2015, vol. 28, No. 2, p. 130-135 (Year: 2015).*

(Continued)

*Primary Examiner* — Robert C Boyle
(74) *Attorney, Agent, or Firm* — Calfee, Halter & Griswold LLP

(57) ABSTRACT

Disclosed is a process for making nitrated styrenic fluoropolymers having various degrees of substitution. The nitrated styrenic fluoropolymer is capable of providing an exceptionally high birefringence ranging from 0.02 to 0.036. Further, the birefringence can be tuned by varying the degree of substitution (DS) of the nitro group on the styrenic ring to meet the need for optical compensation film applications. More particularly, the optical compensation films of the present invention are for use in an in-plane switching LCD (IPS-LCD) and OLED display.

26 Claims, 1 Drawing Sheet

(56) References Cited

OTHER PUBLICATIONS

Translation of Lu, Journal of Functional Polymers, Jun. 2015, vol. 28, No. 2, p. 130-135 (Year: 2015).*
ISR and Written Opinion from PCT/US2017/046498 dated Nov. 21, 2017.
ISR and Written Opinion from PCT/US2017/046548 dated Nov. 22, 2017.
ISR and Written Opinion from PCT/US2017/046432 dated Nov. 21, 2017.
ISR and Written Opinion from PCT/US2017/046490 dated Nov. 20, 2017.

* cited by examiner

METHOD FOR THE PREPARATION OF NITRATED STYRENIC FLUOROPOLYMERS

CROSS-REFERENCE TO RELATED APPLICATIONS

This application claims priority to and the benefit of U.S. Provisional Patent Application No. 62/374,242, filed Aug. 12, 2016, and U.S. Provisional Patent Application No. 62/374,247, filed Aug. 12, 2016, the entire contents of which are incorporated by reference herein.

FIELD

This invention relates to a process for making nitrated styrenic fluoropolymers having various degrees of substitution. More specifically, this invention relates to the preparation of nitrated styrenic fluoropolymers having various degrees of nitration that are capable of providing an exceptionally high birefringence ranging from 0.02 to 0.036. Further, the birefringence can be tuned by varying the degree of substitution (DS) of the nitro group on the styrenic ring to meet the need for optical compensation film applications. More particularly, the optical compensation films of the present invention are for use in an in-plane switching LCD (IPS-LCD) and OLED display.

BACKGROUND

U.S. Pat. No. 8,304,079 (the '079 patent) discloses a polymer film (a positive C-plate) having a positive out-of-plane birefringence greater than 0.002 throughout the wavelength range of 400 nm<λ<800 nm, wherein the film having been cast onto a substrate from a solution of a polymer having a moiety of:

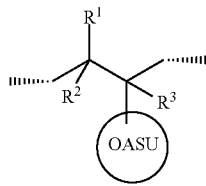

wherein $R^1$, $R^2$, and $R^3$ are each independently hydrogen atoms, alkyl groups, substituted alkyl groups, or halogens, wherein OASU is a disk-like group or a mesogen, and wherein OASU is attached to the polymer backbone through a single covalent bond.

The most common polymer having a disk-like OASU is polystyrene, the solution-cast film of which generally has a birefringence of 0.001-0.002. It was disclosed in the '079 patent that the birefringence of polystyrene could be increased by incorporating a birefringence-enhancing substituent (BES) such as a bromo group or a nitro group onto the benzene ring. For example, poly(nitrostyrene) was reported to have a birefringence as high as about 0.016, and poly(bromostyrene) as high as about 0.007.

Additionally, U.S. Pat. No. 8,802,238 discloses that the birefringence of the polystyrene film can be greatly increased by incorporating fluorine atoms onto the backbone of the polystyrene molecule. Such a polymer film has a birefringence as high as about 0.015-0.02.

Although much has been achieved in increasing the birefringence of the styrenic polymer film, there remains a need for an even higher birefringence in the industry. For example, mobile devices based on OLED display technology have increasingly surpassed those based on LCD display technology. In an OLED device, a polarizer in combination with a quarter wave plate (QWP) is used to reduce the ambient light for improving viewing quality. The QWP used in the OLED configuration often has higher out-of-plane retardation needed for compensation than the A-plate used in the IPS-LCD configuration. Thus, there exists a need for a positive C-plate with exceptionally high out-of-plane birefringence to compensate the QWP used in an OLED configuration in order to optimize the image quality. Polymer films having a birefringence greater than 0.02 have been disclosed in U.S. Pat. No. 9,096,719. Such polymer films, however, require complicated synthesis schemes and thus are not cost effective for industrial applications. Optical compensation films based on styrenic polymers are especially desirable for their ease of manufacturing and cost effectiveness. Thus, styrenic polymers having a birefringence greater than 0.02 have been recognized as an ideal solution to fulfill this unmet need.

SUMMARY

This invention provides a method for the preparation of a nitrated styrenic fluoropolymer having an average degree of substitution (DS) ranging from about 0.2 to about 1 of the nitro group on the styrenic ring comprising the steps of:
  i. providing a styrenic fluoropolymer having a styrenic unit of wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, and wherein R is hydrogen or a substituent on the styrenic ring;
  ii. optionally mixing the styrenic fluoropolymer with an organic solvent;
  iii. mixing the styrenic fluoropolymer of (i) or (ii) with a combination of nitric acid in an amount from about 0.2 to about 5 moles per styrenic unit and sulfuric acid in an amount from about 1 to about 20 moles per styrenic unit; and
  iv. reacting the mixture of (iii) for a period of time to obtain the nitrated styrenic fluoropolymer having an average DS of from about 0.2 to about 1 of the nitro group.

In some embodiments of the method, the styrenic fluoropolymer is poly(α,β,β-trifluorostyrene), the amount of nitric acid is from about 0.2 to about 3.5 moles per styrenic unit, and a molar ratio of sulfuric acid to nitric acid is from about 2:1 to about 3.5:1.

In another embodiment, the method further comprises a step of adding a carboxylic acid to the reaction mixture to precipitate the nitrated styrenic fluoropolymer product after the completion of the reaction.

DETAILED DESCRIPTION

Figure 1:
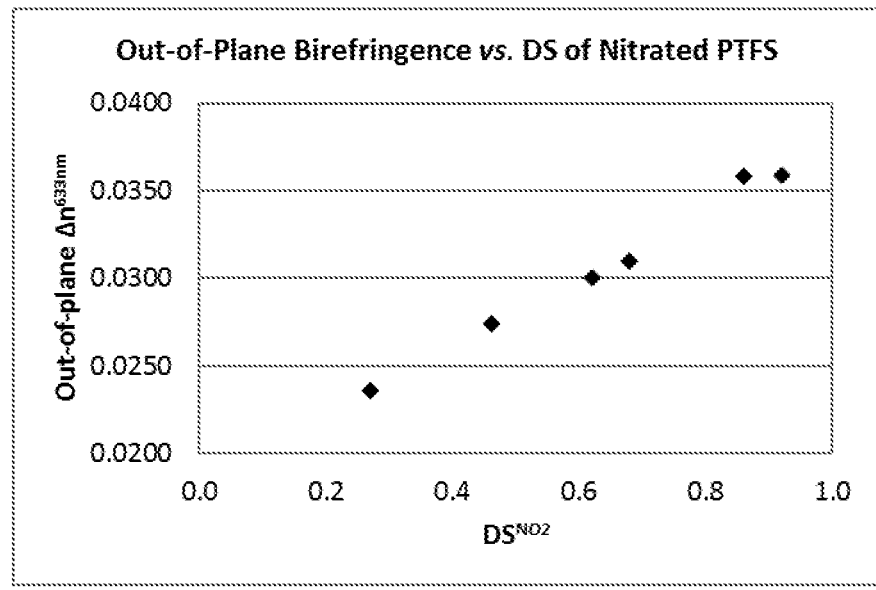
FIG. 1 is a graphical representation of the out-of-plane birefringence vs. the degree of substitution (DS) of nitrated poly(α,β,β-trifluorostyrene) (PTFS) Films.

As is known in the art, the birefringence of a polymer film prepared by solution cast is dependent on the polymer's intrinsic birefringence and the order parameter upon film casting. The intrinsic birefringence depends on the chemical structure of the polymer, while the order parameter depends on the molecular orientation during film formation. Both of the intrinsic birefringence and the order parameter can be affected by the substituents on the backbone of the styrenic polymer as well as those on the phenyl ring. These substituents can also interact with each other, resulting in enhanced or reduced birefringence of the polymer film. Thus, it remains a challenge to discover a styrenic polymer that has an out-of-plane birefringence greater than 0.02.

It has been found that polymer films made from nitrated styrenic fluoropolymers having various degrees of nitration are capable of providing an exceptionally high birefringence ranging from 0.02 to 0.036. Further, the birefringence can be tuned by varying the degree of substitution (DS) of the nitro group on the styrenic ring to meet the need for optical compensation film applications. For example, in a mobile phone device, an extra thin film is desirable to reduce the thickness, which in turn requires a compensation film with an extra high birefringence for adequate compensation. On the contrary, in some optical configurations, the extra high birefringence is not needed. Thus, it is advantageous to have a process that can be readily tuned to provide optical films having a range of birefringence for various applications.

Thus, this invention provides a method for the preparation of a nitrated styrenic fluoropolymer having an average degree of substitution (DS) ranging from about 0.2 to about 1 of the nitro group on the styrenic ring comprising the steps of:

i. providing a styrenic fluoropolymer having a styrenic unit of

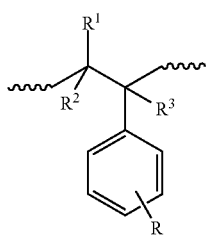

wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, and wherein R is hydrogen or a substituent on the styrenic ring;

ii. optionally mixing the styrenic fluoropolymer with an organic solvent;

iii. mixing the styrenic fluoropolymer of (i) or (ii) with a combination of nitric acid in an amount from about 0.2 to about 5 moles per styrenic unit and sulfuric acid in an amount from about 1 to about 20 moles per styrenic unit; and iv. reacting the mixture of (iii) for a period of time to obtain the nitrated styrenic fluoropolymer having an average DS of from about 0.2 to about 1 of the nitro group.

In one aspect, at least two of $R^1$, $R^2$, and $R^3$ of the styrenic unit are fluorine atoms. In another aspect, $R^1$, $R^2$, and $R^3$ of the styrenic unit are all fluorine atoms.

The styrenic fluoropolymer (i) may be a homopolymer or a copolymer. The homopolymer may be prepared by polymerization of a fluorine-containing monomer having the structures below:

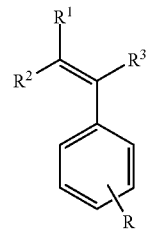

wherein $R^1$, $R^2$, and $R^3$ are each independently hydrogen atoms, alkyl groups, substituted alkyl groups, or halogens and wherein at least one of $R^1$, $R^2$, and $R^3$ is a fluorine atom, wherein R is hydrogen or a substituent on the styrenic ring. Examples of the substituent R on the styrenic ring include one or more of alkyl, substituted alkyl, halogen, hydroxyl, carboxyl, alkoxy, amino, sulfonate, phosphate, acyl, acyloxy, phenyl, alkoxycarbonyl, cyano, and the like.

Examples of such fluorine-containing monomers include, but are not limited to, α,β,β-trifluorostyrene, α,β-difluorostyrene, β,β-difluorostyrene, α-fluorostyrene, and β-fluorostyrene.

In one embodiment, the styrenic fluoropolymer is a homopolymer. Exemplary homopolymers included, but are not limited to, poly(α,β,β-trifluorostyrene), poly(α,β-difluorostyrene), poly(β,β-difluorostyrene), poly(α-fluorostyrene), and poly(β-fluorostyrene). In one embodiment, the styrenic fluoropolymer is poly(α,β,β-trifluorostyrene).

The copolymer may be prepared by copolymerization of one or more of the fluorine-containing monomers with one or more ethylenically unsaturated monomers. Examples of ethylenically unsaturated monomers include, but are not limited to, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, styrene, α-methyl styrene, nitrostyrene, bromostyrene, iodostyrene, cyanostyrene, chlorostyrene, 4-t-butylstyrene, 4-methylstyrene, vinyl biphenyl, vinyl triphenyl, vinyl toluene, chloromethyl styrene, acrylic acid, methacrylic acid, itaconic acid, crotonic acid, maleic anhydride, tetrafluoroethylene (and other fluoroethylenes), glycidyl methacrylate, carbodiimide methacrylate, C1-C18 alkyl crotonates, di-n-butyl maleate, di-octylmaleate, allyl methacrylate, di-allyl maleate, di-allylmalonate, methyoxybutenyl methacrylate, isobornyl methacrylate, hydroxybutenyl methacrylate, hydroxyethyl(meth)acrylate, hydroxypropyl(meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl(meth)acrylate, methacrylamide, acrylamide, butyl acrylamide, ethyl acrylamide, diacetoneacrylamide, butadiene, vinyl ester monomers, vinyl(meth)acrylates, isopropenyl(meth)acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, monovinyl adipate, t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamidoethylethylene urea. Further monomers are described in The Brandon Associates, 2nd edition, 1992 Merrimack, N.H., and in Polymers and Monomers, the 1996-1997 Catalog from Polysciences, Inc., Warrington, Pa., U.S.A.

In one embodiment, the styrenic fluoropolymer is a copolymer of α,β,β-trifluorostyrene with one or more ethylenically unsaturated monomers selected from the group consisting of styrene, methyl acrylate, methyl methacrylate, butyl acrylate, butyl methacrylate, 2-ethylhexyl acrylate, acrylic acid, methacrylic acid, α-methyl styrene, 4-methylstyrene, vinyl biphenyl, acrylonitrile, and isoprene.

Polymerization may be carried out by a method known in the art such as bulk, solution, emulsion, or suspension polymerization. The reaction may be free radical, cationic, anionic, zwitterionic, Ziegler-Natta, or atom transfer radical type of polymerization. Emulsion polymerization is one method of polymerization when a particularly high molecular weight is desirable. A high molecular weight polymer may lead to better film quality and higher positive birefringence. Methods for the preparation of homopolymers and copolymers of monofluoro-, difluoro-, and trifluorostyrene can be found in *Progress in Polymer Science*, Volume 29 (2004), pages 75-106, Elsevier Ltd., MO, USA, the content of which is incorporated herein by reference.

This invention discloses a process for making nitrated styrenic fluoropolymers using a combination of nitric acid and sulfuric acid. This process is commonly known as nitration, in which nitro groups are substituted to the styrenic rings. Styrenic fluoropolymers with substituents on the rings may also be prepared by polymerization of the styrenic monomers having said substituents already on the rings, for example, 3-nitro-α,β,β-trifluorostyrene. Nevertheless, the preparation of the nitro substituted styrenic monomer is not readily feasible as the nitration will occur at the vinyl group first. The nitration on the ring can possibly be done by protecting and de-protecting the vinyl group, but this involves a complicated synthesis scheme and is not cost effective.

Since the nitrated styrenic fluoropolymer cannot be readily prepared from the nitro monomer, it is particularly challenging to control the degree of substitution (DS) of the nitro group on the styrenic ring. This invention provides a process for controlling the nitration to a desirable DS, for example, an average DS of from about 0.2 to about 1.

The present inventors have surprisingly discovered that the nitration process of the powdery styrenic fluoropolymer can be done without an organic solvent. This is advantageous in eliminating the steps needed for the treatment of the organic solvent used in the reaction such as separating, recovering, and disposing. Thus, the nitration can be done with or without an organic solvent. An organic solvent may be used to dissolve the styrenic fluoropolymer to facilitate the reaction but is not required for the process of this invention. Suitable organic solvents that may be used in the methods disclosed herein include dichloromethane, dichloroethane, nitrobenzene, nitrotoluene, N,N-dimethylformamide, N,N-dimethylacetamide, N-methyl-2-pyrrolidone, and mixtures thereof.

In the nitration process, nitric acid and sulfuric acid may be premixed before the addition to either the styrenic fluoropolymer itself or the styrenic fluoropolymer in an organic solvent, or they may be added separately. For example, nitric acid may be first added to the reaction mixture, followed by the addition of sulfuric acid over a period of time, or sulfuric acid is added first followed by nitric acid. The preferred method is to add the mixed acid. The acids, either mixed or separately, may be added over a period of time, for example, ranging from 5 minutes to 2 hours, desirably from 30 minutes to 3 hours.

The reaction can be carried out at a temperature ranging from 25° C. to 80° C., desirably at 40° C. to 70° C. or 50° C. to 60° C. The reaction is carried out for a period of time sufficient to obtain the desirable DS (i.e., an average DS of from about 0.2 to about 1), for example, from one hour to 48 hours, desirably from 2 hours to 20 hours, 3 hours to 10 hours, 4 hours to 8 hours, or 5 hours to 6 hours.

The reaction can be quenched by adding either water or a mixture of water and ice. After the reaction, the mixture can be worked up in accordance with a procedure known in the art. For example, it can be poured into methanol to afford a powdery polymer, which can then be isolated, washed repeatedly with, for example, water and methanol. The resulting purified polymer can then be dried by a method known in the art, for example, at an elevated temperature under reduced pressure. It should be noted, however, that the unreacted nitric acid present in the reaction mixture potentially can form methyl nitrate, which is known to be highly explosive. Thus, the use of methanol or other alcohols for precipitating the polymer product is undesirable, and there is a need to find an alternative. The present inventors have unexpectedly discovered that this precipitation step can be effectively carried out by adding a carboxylic acid such as, for example, propionic acid or acetic acid to the reaction mixture. The powdery polymer product thus produced can be isolated and purified more effectively.

Thus, in another embodiment, the method of this invention further comprises a step of adding a carboxylic acid to the reaction mixture to precipitate the nitrated styrenic fluoropolymer product after the completion of the reaction. As an alternative, the reaction mixture can also be poured into a carboxylic acid to precipitate the polymer product. Examples of carboxylic acids suitable for this step include, but are not limited to, propionic acid, acetic acid, formic acid, butyric acid, and mixtures thereof. In certain embodiments, the carboxylic acid used to precipitate the nitrated styrenic fluoropolymer product after completion of the reaction comprises propionic acid. In certain embodiments, the carboxylic acid used to precipitate the nitrated styrenic fluoropolymer product after completion of the reaction comprises acetic acid. In certain embodiments, the carboxylic acid used to precipitate the nitrated styrenic fluoropolymer product after completion of the reaction comprises formic acid. In certain embodiments, the carboxylic acid used to precipitate the nitrated styrenic fluoropolymer product after completion of the reaction comprises propionic acid, acetic acid, and formic acid.

Further, it has also been found that an alkane such as, for example, heptane can also be used for precipitating the polymer product having a DS of nitro from about 0.1 to about 0.3. Suitable alkanes for precipitating the polymer product having a DS of nitro from about 0.1 to about 0.3 include, but are not limited to, hexane, heptane, and mixtures thereof.

In the nitrated styrenic fluoropolymer of the invention, each styrenic moiety may or may not be substituted (but at least one is substituted). The average number of the substituents on a styrenic moiety in the polymer can range from about 0.2 to about 1, which is referred herein as the degree of substitution (DS) of the nitro group in the polymer.

It has been found that the DS of the nitro group can be controlled by varying the amounts of the nitric acid employed in the reaction. The higher the amount of nitric acid, the higher the DS of the nitro group. Sulfuric acid functions both as a reaction medium and an acid catalyst. The amount of sulfuric acid used in the reaction is not particularly limited. Increasing the amount of sulfuric acid can accelerate the reaction and thus reduce the reaction time and/or increase the DS of nitro. Additionally, it was surprisingly found that the molar ratio of sulfuric acid to nitric acid used in the reaction can have a significant effect on the clarity of the solution of the polymer produced. For example, when the molar ratio of sulfuric acid to nitric acid is about 2:1 to about 3.5:1, a haze value (%) of less than 10% can be obtained; when the molar ratio of sulfuric acid to nitric acid is about 2:1 to about 3:1, a haze value of less than 5% can be obtained; when the molar ratio of sulfuric acid to nitric acid is about 2:1 to about 2.5:1, a haze value of less than 3% can be obtained; and when the molar ratio of sulfuric acid to nitric acid is about 2:1 to about 2.3:1, a haze value of less than 1% can be obtained. Low haze is desirable for optical film application to ensure the formation of polymer films having adequate optical clarity. A haze value of less than 3% is typically required for such applications. The haze value (% haze) was obtained by using Hunterlab Ultrascan VIS in diffused transmission mode (available from Hunterlab, Va., US) in accordance with the procedure described in Example 5. The sample for the measurement is prepared by dissolving the polymer in methyl ethyl ketone to yield a 15% polymer solution by weight; the cell path length is 10 mm.

In some embodiments, the amount of the nitric acid used in the reaction is from 0.2 to 3.5 moles per styrenic unit, or 0.2 to 0.5, 0.51 to 2.5, 2.51 to 3.5, or 1.8 to 2.5 moles per styrenic unit.

In some embodiments, the styrenic fluoropolymer is poly($\alpha,\beta,\beta$-trifluorostyrene), the amount of nitric acid is from about 0.2 to about 3 moles per styrenic unit, and the molar ratio of sulfuric acid to nitric acid is from about 2:1 to about 3.5:1, or from about 2:1 to about 2.5:1.

In further embodiments, the styrenic fluoropolymer is poly($\alpha,\beta,\beta$-trifluorostyrene), the amount of nitric acid is from about 0.2 to about 0.5 moles per styrenic unit, and the DS of the nitrated styrenic fluoropolymer is from about 0.2 to about 0.5; or the amount of nitric acid is from about 0.51 to about 2.5 moles, and the DS is from about 0.5 to about 0.8; or the amount of nitric acid is from about 2.5 to about 3.5 moles, and the DS is from about 0.76 to about 0.8. In one aspect, fuming sulfuric acid (e.g., 10-30% free $SO_3$ dissolved in sulfuric acid) is used to replace the concentrated sulfuric acid to achieve a DS from about 0.9 to about 1. In this aspect, the amount of nitric acid is from about 1.8 to 2.5 moles per styrenic unit.

The styrenic unit in poly($\alpha,\beta,\beta$-trifluorostyrene) (PTFS) has a formula of $CF_2CF(C_6H_5)$, which has a formula weight of 158 g/mole. The amount of nitric acid used in the reaction is expressed as the number of moles per styrenic unit in accordance with the calculations below:

Moles of nitric acid=grams of nitric acid/formula weight of $HNO_3$ (63 g/mole)

Moles of styrenic unit=grams of PTFS/formula weight of styrenic unit (158 g/mole)

Moles of nitric acid per mole of styrenic acid=moles of nitric acid/moles of styrenic unit The number of moles of sulfuric acid ($H_2SO_4$) per styrenic unit can be calculated in a manner similar to the calculation of the number of moles of nitric acid shown above. It should be noted that unless fuming sulfuric acid (>100%) or fuming nitric acid (>100%) is used, the concentrations of nitric acid and sulfuric acid used in the Examples are 69% and 95-98% by weight respectively. This needs to be taken into account when performing the calculations. The average concentration (96.5%) of sulfuric acid is used for the calculation.

It has also been found that when fuming sulfuric acid (containing anhydrous $SO_3$) is used instead of sulfuric acid for the nitration of PTFS, a higher DS (e.g., 0.9) of the nitro group can be achieved.

Polymer films can be prepared by solution cast of the nitrated styrenic fluoropolymer prepared by the method of this invention in a suitable solvent. The polymer film thus prepared has a positive out-of-plane birefringence and is commonly referred to as positive C-plate. Positive out-of-plane birefringence ($\Delta n$) is defined as $n_z>(n_x+n_y)/2$, wherein $n_x$ and $n_y$ represent in-plane refractive indices, and $n_z$ represents the thickness-direction refractive index of the film (i.e., $\Delta n=n_z-(n_x+n_y)/2$).

Birefringence ($\Delta n$) may be measured by determining the birefringence of a film over a wavelength range of about 400 nm to about 800 nm at different increments. Alternatively, birefringence of a film may be measured at 633 nm as is customary in the art. Reference to $\Delta n$ at 633 nm is customary because birefringence at wavelengths <633 nm is generally higher than birefringence at 633 nm for a film with positive birefringence, and birefringence at wavelengths >633 nm is generally the same as or slightly lower than birefringence at 633 nm. Thus, birefringence at 633 nm is understood in the art as indicating that birefringence throughout 400 nm<$\lambda$<800 nm is greater than or approximately the same as the birefringence at 633 nm.

In one embodiment, the polymer film has a positive birefringence greater than 0.02, greater than 0.021, greater than 0.022, greater than 0.023, greater than 0.025, greater than 0.027, greater than 0.028, greater than 0.029, greater than 0.03, greater than 0.031, greater than 0.032, greater than 0.033, greater than 0.034, greater than 0.035, or greater than 0.0358 throughout the wavelength range of 400 nm<$\lambda$<800 nm. In certain embodiments, the polymer film has a positive birefringence of 0.02 to 0.2, including from 0.021 to 0.2, from 0.022 to 0.2, from 0.023 to 0.2, from 0.023 to 0.2, from 0.025 to 0.2, from 0.027 to 0.2, from 0.028 to 0.2, from 0.029 to 0.2, from 0.03 to 0.2, from 0.031 to 0.2, from 0.032 to 0.2, from 0.033 to 0.2, from 0.034 to 0.2, from 0.035 to 0.2, and from 0.0358 to 0.2 throughout the wavelength range of 400 nm<$\lambda$<800 nm.

In certain embodiments, when the DS of the $NO_2$ group is about 0.3, the birefringence is about 0.023. In certain embodiments, when the DS of the $NO_2$ group is about 0.45, the birefringence is about 0.027. In certain embodiments, when the DS of the $NO_2$ group is about 0.6, the birefringence is about 0.03. In certain embodiments, when the DS of the $NO_2$ group is about 0.85, the birefringence is about 0.035.

The casting of a polymer solution onto a substrate may be carried out by a method known in the art such as, for example, spin coating, spray coating, roll coating, curtain coating, or dip coating. Substrates are known in the art, non-limiting examples of which include triacetylcellulose (TAC), cyclic olefin polymer (COP), polyester, polyvinyl alcohol, cellulose ester, cellulose acetate propionate (CAP), polycarbonate, polyacrylate, polyolefin, polyurethane, polystyrene, glass, and other materials commonly used in an LCD or OLED device.

In another embodiment of this invention, the styrenic fluoropolymer is soluble in a solvent such as toluene, methyl isobutyl ketone, cyclopentanone, methylene chloride, 1,2-dichloroethane, methyl amyl ketone, methyl ethyl ketone, methyl isoamyl ketone, and mixtures thereof. Solution film casting may be done with a nitrated styrenic fluoropolymer solution or a solution comprising a blend of the nitrated styrenic fluoropolymer and other polymers. Polymer solutions may further contain other additives such as plasticizers. Plasticizers are common additives used for film formation to improve film properties.

Examples of the plasticizers suitable for this invention include, but are not limited to, those available from Eastman Chemical Company (Kingsport, Tenn.): Abitol E (hydrogenated gum rosin), Permalyn 3100 (tall oil rosin ester of pentaerythritol), Permalyn 2085 (tall oil rosin ester of glycerol), Permalyn 6110 (gum rosin ester of pentaerythritol), Foralyn 110 (hydrogenated gum rosin ester of pentaerythritol), Admex 523 (a dibasic acid glycol polyester), and Optifilm Enhancer 400 (a proprietary low VOC, low odor coalescent); those available from Unitex Chemical Corp. (Greensboro, N.C.): Uniplex 552 (pentaerythritol tetrabenzoate), Uniplex 280 (sucrose benzoate), and Uniplex 809 (PEG di-2-ethylhexoate); triphenylphosphate, tri(ethylene glycol)bis(2-ethylhexanoate), tri(ethylene glycol)bis(n-octanoate), and mixtures thereof.

In another embodiment, the polymer solution further comprises one or more of the plasticizers selected from the group consisting of triphenylphosphate, tri(ethylene glycol) bis(2-ethylhexanoate), tri(ethylene glycol)bis(n-octanoate); Optifilm Enhancer 400, Abitol E, and Admex 523 available from Eastman Chemical Company (Kingsport, Tenn.). Uniplex 552, Uniplex 809, and Uniplex 280 available from Unitex Chemical Corp. (Greensboro, N.C.).

A unique feature of the present invention is the high out-of-plane birefringence ($\Delta n = n_z - (n_x + n_y)/2$) of the film resulting from solution cast of a substituted styrenic fluoropolymer. This allows for the casting of a thin coating film onto a substrate to yield a compensation film having a desirable out-of-plane retardation ($R_{th}$). As is commonly known in the art, the retardation of an optical film is defined as $R = \Delta n \times d$, wherein d is the thickness of the film. In one embodiment, the thickness of a coating on a substrate for optical film applications is about 1-15 µm (including, but not limited to, 1 µm, 2 µm, 3 µm, 4 µm, 5 µm, 6 µm, 7 µm, 8 µm, 9 µm, 10 µm, 11 µm, 12 µm, 13 µm, 14 µm, or 15 µm), and in another embodiment, the thickness is about 1 µm to about 12 pun.

In another embodiment, the compensation film is used in a liquid crystal display device including an in-plane switching liquid crystal display device. The liquid crystal display device may be used as a screen for a mobile phone, tablet, computer, or television.

In an OLED device, a polarizer in combination with a quarter wave plate (QWP) is used to reduce the ambient light. The QWP used in the OLED configuration often has a high out-of-plane retardation needed for compensation. The QWP coated with the positive birefringence polymer film of this invention may be combined with a linear polarizer to yield a circular polarizer. Thus, this invention further provides a circular polarizer comprising a linear polarizer and a coated QWP of the present invention. In another embodiment, there is provided an OLED display comprising a circular polarizer of the present invention. The circular polarizer can also be used for 3D glasses.

In another embodiment, the compensation film is used in an OLED display device. The OLED display device may be used as a screen for a mobile phone, tablet, computer, or television.

EXAMPLES

The following examples describe and demonstrate exemplary embodiments of the polymers, polymer solutions, polymer films, and methods described herein. The exemplary embodiments are provided solely for the purpose of illustration and are not to be construed as limitations of the present disclosure, as many variations thereof are possible without departing from the spirit and scope of the present disclosure.

Example 1. Polymer Film Preparation and Birefringence Measurement

A sample of a nitrated styrenic fluoropolymer was dissolved in a suitable solvent such as, for example, methylene chloride at 7 weight % or methyl ethyl ketone at 12 weight %. The solution was applied to a flat glass substrate using the blade casting method with a desired gap, for example, a gap of 4 mils (100 µm). The film was allowed to dry in air overnight and subsequently placed in a vacuum oven at 80° C. for 8 hours. After drying, the film was peeled off. Birefringence of the free standing polymer film was measured by a Metricon Model 2010/M Prism Coupler using single film mode at the wavelength of 633 nm.

Example 2. Synthesis of Nitrated Poly($\alpha,\beta,\beta$-Trifluorostyrene) (PTFS) Having Various Degrees of Substitution (Polymer 1)

Materials: poly($\alpha,\beta,\beta$-trifluorostyrene) (PTFS) was an internal product with an intrinsic viscosity (IV) of 1.10 dL/g, used as received. Dichloromethane (DCM) was from Acros, purified by passing through $SiO_2$. $HNO_3$ was from Acros (68%-70%), used as received. $H_2SO_4$ was from Sigma Aldrich (95.0%-98.0%), used as received. Fuming $H_2SO_4$ was from Alfa Aesar (18%-24% free $SO_3$), used as received.

To a one-liter three-neck round-bottom flask equipped with nitrogen inlet/outlet and a mechanical stirrer was charged a solution (200 g, 5 weight 0%) of PTFS (IV, 1.10 dL/g) in dichloromethane (DCM). Separately, a mixed acid solution was prepared by adding concentrated sulfuric acid (13.6 g) to nitric acid (1.64 g). The flask was placed in a water bath at room temperature (e.g., 20° C. to 30° C.). To the stirred PTFS solution in the flask was added the mixed acid over a period of 10 minutes. The reaction mixture was allowed to react at room temperature for 21 hours and subsequently quenched by adding deionized water/ice (450 ml). The water phase at the top was then decanted and the organic phase washed repeatedly with deionized water to remove the acids. The resulting organic layer was precipitated into methanol (about one liter) and ground in a high speed blender to yield a powder suspension. The powder was then filtered and washed repeatedly with water and methanol. The resulting product was dried at 80° C. under reduced pressure overnight. Intrinsic viscosity (IV) of the polymer was 1.20 dL/g, measured by a Cannon® auto capillary viscometer using N-methyl-2-pyrrolidone (NMP) as the solvent at 30° C. The degree of substitution (DS) of the nitro group in the product was determined to be 0.27 by elemental analysis (EA).

By using the same method, nitrated PTFS polymers (Polymers 1-6) having various degrees of substitution (DS) were prepared as listed in Table 1. It should be noted that unless fuming sulfuric acid (20% free $SO_3$ dissolved in sulfuric acid) was used, the concentrations of nitric acid and sulfuric acid used were 69% and 95-98% by weight respectively. This was taken into account when the calculations were performed. The average concentration (96.5%) of sulfuric acid was used for the calculations.

nitric acid (69%, 1.12 kg) in 2.5 hours. The mixture was then heated to 60° C. and held for 4 hours. Propionic acid (13.3 kg) was added to precipitate the product while the mixture was being cooled to room temperature (e.g., 20° C. to 30° C.). The resulting suspension was filtered, and the crude powder product was washed first with propionic acid twice and then with methanol repeatedly. The resulting product was dried at 60° C. under reduced pressure to give 1.3 kg powder product. The degree of substitution (DS) of the nitro group in the product was determined to be 0.72 by elemental analysis (EA). The product was dissolved in methyl ethyl ketone to make a 15 weight % polymer solution. The haze of the polymer solution was measured to be 0.23% by using the method described in Example 5.

TABLE 1

Synthesis of Nitrated PTFS Having Various Degrees of Substitution

| ID | PTFS, g | Moles of styrenic unit | $HNO_3$ (69%), g | Moles of $HNO_3$ per styrenic unit | $H_2SO_4$ (95-98%), g | Moles of $H_2SO_4$ based on styrenic unit | Mole Ratio of Sulfuric Acid to Nitric Acid | Yield, g | IV, dL/g | DS from EA |
|---|---|---|---|---|---|---|---|---|---|---|
| Polymer 1 | 10 | 0.06 | 1.64 | 0.28 | 13.6 | 2.12 | 7.5:1 | 10.65 | 1.2 | 0.27 |
| Polymer 2 | 19.07 | 0.12 | 5.53 | 0.50 | 44 | 3.59 | 7.2:1 | 20.25 | 1.21 | 0.47 |
| Polymer 3 | 17.39 | 0.11 | 10.08 | 1.00 | 43.7 | 3.91 | 3.9:1 | 19.11 | 1.19 | 0.62 |
| Polymer 4 | 15.31 | 0.10 | 17.64 | 1.99 | 44.6 | 4.53 | 2.3:1 | 17.21 | 1.15 | 0.68 |
| Polymer 5 | 16.17 | 0.10 | 27.81 | 2.98 | 70.6 | 6.79 | 2.3:1 | 16.65 | 1.2 | 0.86 |
| Polymer 6 | 15.97 | 0.10 | 18.84 | 2.04 | 124.8 (Fuming) | 13.0 | 6.4:1 | 18.2 | 1.18 | 0.92 |

Figure 2:
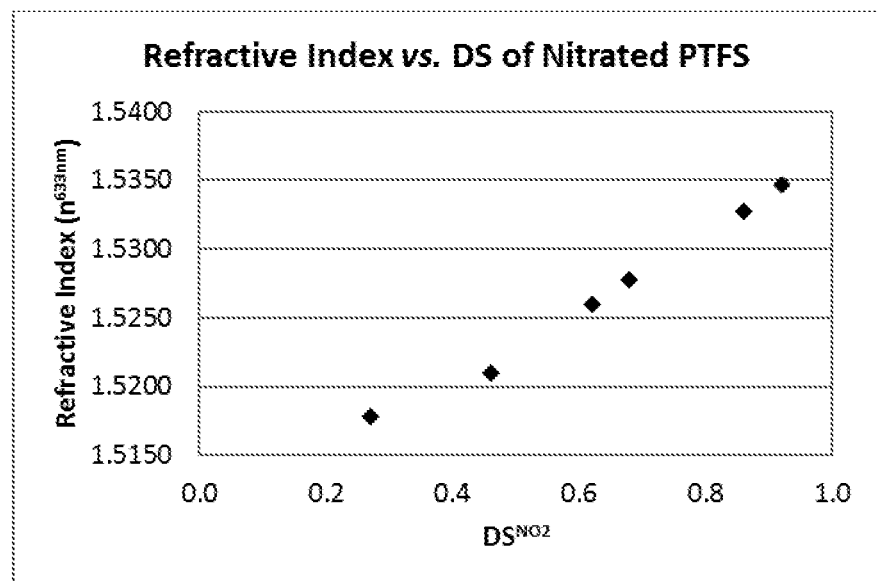
FIG. 2 is a graphical representation of the refractive index vs. the DS of nitrated PTFS films.

Example 3. Optical Properties of Nitrated PTFS Films Having Various Degrees of Substitution Films 1-6 in Table 2 were thin films prepared from polymers in Table 1 (Polymers 1-6), using MEK as the casting solvent. All films were controlled at a thickness of 4.0-5.0 μm for comparison. Based on the results in Table 2, the birefringence and the refractive index were plotted respectively against the degree of substitution in FIG. 1 and FIG. 2, where the two properties increase with increasing DS.

TABLE 2

Optical Properties of Nitrated PTFS Films Having Various Degrees of Substitution

| ID | $DS^{NO_2}$ | IV, dL/g | Casting Solvent | $n^{633\ nm}$ | $\Delta n^{633\ nm}$ | Thickness, μm |
|---|---|---|---|---|---|---|
| Film 1 | 0.27 | 1.20 | MEK | 1.5178 | 0.0236 | 4.9 |
| Film 2 | 0.47 | 1.21 | MEK | 1.5210 | 0.0274 | 4.3 |
| Film 3 | 0.62 | 1.19 | MEK | 1.5260 | 0.0300 | 4.5 |
| Film 4 | 0.68 | 1.15 | MEK | 1.5278 | 0.0310 | 4.0 |
| Film 5 | 0.86 | 1.20 | MEK | 1.5327 | 0.0358 | 4.0 |
| Film 6 | 0.92 | 1.18 | MEK | 1.5347 | 0.0359 | 5.0 |

Example 4: Synthesis of Nitrated Poly(α,β,β-Trifluorostyrene) (N-PTFS 3) Having DS=0.72 with Low Haze Poly(α,β,β-trifluorostyrene) (PTFS; IV, 1.10 dL/g) (1.2 kg) was mixed with 1,2-dichloroethane (13.8 kg) in a 19 L reactor under nitrogen. The mixture was heated to 50° C. with agitation. Once the solid was dissolved, the mixture was further heated to 55° C. To the resulting solution was then added a mixture of sulfuric acid (98%, 2.89 kg) and

Example 5. Polymer Solution Preparation and % Haze Measurement

To the stirred methyl ethyl ketone (MEK, 141.6 g) solvent in a glass jar was added PTFS powder (25.0 g) and the resulting mixture stirred until a polymer solution was obtained. The haze of the polymer solution (15% by weight) thus obtained was measured using Hunterlab Ultrascan VIS diffused transmission mode (available from Hunterlab, Va., US) in accordance with the procedure below:

a. Place 100% MEK into a glass or quartz cell (10 mm cell path length);
b. Measure the haze of 100% MEK (10 times to obtain an average value); if the value is greater than 0.5%, clean the cell and re-measure repeatedly until a value of smaller than 0.5% can be obtained;
c. Empty MEK from the cell and replace it with the polymer solution;
d. Measure the haze 10 times to obtain an average value; and
e. The final haze value of the polymer solution=the average haze of the polymer solution—the average haze of the 100% MEK.

Comparative Example 1: Synthesis of Nitrated Poly(α,β,β-Trifluorostyrene) (N-PTFS 3) High Haze A 300 mL jacketed resin kettle reactor was equipped with mechanical stirring, a thermocouple, an addition funnel, and a condenser. In the reactor, poly(α,β,β-trifluorostyrene) (PTFS) (IV 1.32 dL/g, 21.75 g) was mixed with 1,2-dichloroethane (250.57 g) and subsequently heated to 50° C. with agitation. Once the solid was dissolved, the mixture was further heated to 55° C. To the resulting solution was then added a mixture of sulfuric acid (98%, 56.02 g) and nitric acid (69%, 12.54 g) in 30 minutes. The mixture was heated to 60° C. and held for 3 hours. The mixture was drained into propionic acid to yield a fibrous polymer, which was blended using a homogenizer. The resulting suspension was filtered and the crude solid product washed repeatedly with isopropanol and subsequently dried at 60° C. under reduced pressure to yield 23.2 g flake product. The degree of nitration was determined to be 0.72 based on elemental analysis. The product was dissolved in methyl ethyl ketone to make a 15 weight ° % polymer solution. The haze of the polymer solution was measured to be 16.5% by using the method described in Example 5.

Example 6: Study of the Effect of the Acid Ratio on Haze of the Nitrated Poly($\alpha,\beta,\beta$-trifluorostyrene)

A series of nitration reactions of PTFS (IV 1.32 dL/g) was carried out according to the method in Example 4 by varying the amounts of nitric acid and sulfuric acid to study their effects on the haze of the products. As shown in Table 3, when the acid ratios (moles of sulfuric acid to moles of nitric acid) are 4:1 and 3.2:1, the haze values of the products are 14% and 9.4% respectively. It was found, unexpectedly, that when the acid ratio was reduced to 2.5:1, the haze was significantly reduced to 2.6%, which is within the acceptable value for optical film application. The DS of the product, however, was reduced to 0.49 when using the same amount of the nitric acid (1 mole per styrenic unit). It was found that the DS could be raised back to 0.77 by increasing the amount of nitric acid, while maintaining the low acid ratio (i.e., 2.3); an even lower haze (0.2%) was achieved.

TABLE 3

Synthesis of Nitrated PTFS Using Various Acid Ratios

| Nitration | Reaction 1 | Reaction 2 | Reaction 3 | Reaction 4 |
|---|---|---|---|---|
| Moles of sulfuric acid per styrenic unit | 4.0 | 3.2 | 2.5 | 3.68 |
| Moles of nitric acid per styrenic unit | 1.0 | 1.0 | 1.0 | 1.60 |
| Acid Ratio = moles of sulfuric acid to moles of nitric acid | 4:1 | 3.2:1 | 2.5:1 | 2.3:1 |
| DS of the nitrated product | 0.70 | 0.57 | 0.49 | 0.77 |
| % Haze of the product (polymer solution) | 14 | 9.4 | 2.6 | 0.2 |

Example 7. Synthesis of Nitrated Poly($\alpha,\beta,\beta$-Trifluorostyrene) (PTFS) without Organic Solvents (Heterogeneous Reaction)

A 300 mL jacketed resin kettle reactor was equipped with mechanical stirring, a thermocouple, an addition funnel, and a condenser. At room temperature, sulfuric acid (98%, 221.22 g) was charged under nitrogen, followed by the addition of poly($\alpha,\beta,\beta$-trifluorostyrene) (PTFS) (IV 1.18 dL/g, 37.33 g). Nitric acid (69%, 93.36 g) was then gradually added in 40 minutes. The resulting heterogeneous mixture was stirred for 8 hours before being drained into a water-ice (1:1) mixture with agitation. The mixture was subsequently filtered. The solid crude product was mixed with ethanol (320 mL), stirred, and then filtered. This washing process using ethanol was repeated three more times, and the resulting solid product was dried at 60° C. under reduced pressure to yield a powder product (38.5 g). The DS of the nitro group was determined to be 0.70.

Example 8. Synthesis of Nitrated Poly($\alpha,\beta,\beta$-Trifluorostyrene) (PTFS) Using Fuming Nitric Acid without Organic Solvents (Heterogeneous Reaction)

Fuming nitric acid (99%) was purchased from Sigma Aldrich. A 300 mL jacketed resin kettle reactor was equipped with mechanical stirring, a thermocouple, an addition funnel, and a condenser. At 50° C., sulfuric acid (98%, 147.11 g) was charged under nitrogen, followed by the addition of PTFS (IV 1.18 dL/g, 25.20 g). Fuming nitric acid (99%, 43.13 g) was then gradually added in 30 minutes. The heterogeneous mixture was stirred for 3 hours, and then about half of the mixture was drained into a water-ice (1:1) mixture with agitation. The remaining mixture was stirred for another 3 hours before being drained into a fresh water-ice (1:1) mixture. The two isolated mixtures were filtered and purified separately. The solid crude product thus obtained was mixed with ethanol (320 mL), stirred, and then filtered. This washing process using ethanol was repeated three more times, and the resulting solid product was dried at 60° C. under reduced pressure to yield a powder product (10.78 g and 17.45 g respectively). The DS of the nitro group was determined to be 0.73 for the first product and 0.83 for the second.

The terminology as set forth herein is for description of the embodiments only and should not be construed as limiting the disclosure as a whole. All references to singular characteristics or limitations of the present disclosure shall include the corresponding plural characteristic or limitation, and vice versa, unless otherwise specified or clearly implied to the contrary by the context in which the reference is made. Unless otherwise specified, "a," "an," "the," and "at least one" are used interchangeably. Furthermore, as used in the description and the appended claims, the singular forms "a," "an," and "the" are inclusive of their plural forms, unless the context clearly indicates otherwise.

All percentages, parts, and ratios as used herein are by weight of the total composition, unless otherwise specified. All such weights as they pertain to listed ingredients are based on the active level and, therefore, do not include solvents or by-products that may be included in commercially available materials, unless otherwise specified.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, and 10) contained within the range.

Any combination of method or process steps as used herein may be performed in any order, unless otherwise specified or clearly implied to the contrary by the context in which the referenced combination is made.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the applicants intend to indicate "only A or B but not both," then the term "only A or B but not both" will be employed. Thus, use of the term "or" herein is the inclusive, and not the exclusive use. In the present disclosure, the words "a" or "an" are to be taken to include both the singular and the plural. Conversely, any reference to plural items shall, where appropriate, include the singular.

In certain embodiments, it may be possible to utilize the various inventive concepts in combination with one another (e.g., one or more of the various embodiments may be utilized in combination with each other). Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

What is claimed is:

1. A method for the preparation of a nitrated styrenic fluoropolymer having an average degree of substitution (DS) ranging from about 0.2 to about 1 of the nitro group on the styrenic ring comprising the steps of:
   i. providing a styrenic fluoropolymer having a styrenic unit of:

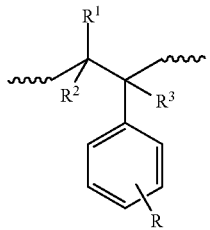

wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, and wherein R is hydrogen or a substituent on the styrenic ring;
   ii. optionally mixing the styrenic fluoropolymer with an organic solvent;
   iii. mixing the styrenic fluoropolymer of (i) or (ii) with a combination of nitric acid in an amount from about 0.2 to about 5 moles per styrenic unit and sulfuric acid in an amount from about 1 to about 20 moles per styrenic unit; and
   iv. reacting the mixture of (iii) for a period of time to obtain the nitrated styrenic fluoropolymer having an average DS of from about 0.2 to about 1 of the nitro group.

2. The method of claim 1, wherein the substituent R on the styrenic ring is one or more selected from the group comprising alkyl, substituted alkyl, halogen, hydroxyl, carboxyl, alkoxy, amino, sulfonate, phosphate, acyl, acyloxy, phenyl, alkoxycarbonyl, and cyano.

3. The method of claim 1, wherein a molar ratio of sulfuric acid to nitric acid is from about 2:1 to about 3.5:1.

4. The method of claim 1, wherein a molar ratio of sulfuric acid to nitric acid is from about 2:1 to about 2.5:1.

5. The method of claim 1, further comprising a step of adding a carboxylic acid to the mixture of (iii) to precipitate the nitrated styrenic fluoropolymer product after the completion of the reaction.

6. The method of claim 5, wherein the carboxylic acid is one or more selected from the group comprising propionic acid, acetic acid, and formic acid.

7. The method of claim 1, wherein at least two of $R^1$, $R^2$, and $R^3$ are fluorine atoms.

8. The method of claim 1, wherein $R^1$, $R^2$, and $R^3$ are fluorine atoms.

9. The method of claim 1, wherein the styrenic fluoropolymer is poly($\alpha,\beta,\beta$-trifluorostyrene).

10. The method of claim 1, wherein the styrenic fluoropolymer is poly($\alpha,\beta,\beta$-trifluorostyrene), the amount of nitric acid is from about 0.2 to about 3.5 moles per styrenic unit, and a molar ratio of sulfuric acid to nitric acid is from about 2:1 to about 3.5:1.

11. The method of claim 1, wherein the styrenic fluoropolymer is poly($\alpha,\beta,\beta$-trifluorostyrene), the amount of nitric acid is from about 0.2 to about 3.5 moles per styrenic unit, and a molar ratio of sulfuric acid to nitric acid is from about 2:1 to about 2.5:1.

12. The method of claim 1, wherein the styrenic fluoropolymer is poly($\alpha,\beta,\beta$-trifluorostyrene), the amount of nitric acid is from about 0.2 to about 0.5 moles per styrenic unit, and the DS of the nitrated styrenic fluoropolymer is from about 0.2 to about 0.5.

13. The method of claim 1, wherein the styrenic fluoropolymer is poly($\alpha,\beta,\beta$-trifluorostyrene), the amount of nitric acid is from about 0.51 to about 2.5 moles per styrenic unit, and the DS of the nitrated styrenic fluoropolymer is from about 0.5 to about 0.8.

14. The method of claim 1, wherein the styrenic fluoropolymer is poly($\alpha,\beta,\beta$-trifluorostyrene), the amount of nitric acid is from about 2.51 to about 3.5 moles per styrenic unit, and the DS of the nitrated styrenic fluoropolymer is from about 0.8 to about 0.9.

15. The method of claim 1, wherein the styrenic fluoropolymer is poly($\alpha,\beta,\beta$-trifluorostyrene), the amount of nitric acid is from about 1.8 to about 2.5 moles per styrenic unit, the sulfuric acid is fuming sulfuric acid, and the DS of the nitrated styrenic fluoropolymer is from about 0.9 to about 1.

16. The method of claim 12, wherein a molar ratio of sulfuric acid to nitric acid is from about 2:1 to about 2.5:1.

17. The method of claim 13, wherein a molar ratio of sulfuric acid to nitric acid is from about 2:1 to about 2.5:1.

18. The method of claim 14, wherein a molar ratio of sulfuric acid to nitric acid is from about 2:1 to about 2.5:1.

19. The method of claim 1, wherein a polymer solution (15% in methyl ethyl ketone by weight) of the obtained nitrated styrenic fluoropolymer has a haze value of less than 3% when measured using a cell having 10 mm path length.

20. The method of claim 1, wherein the reaction is carried out in an organic solvent.

21. The method of claim 1, wherein the reaction is carried out in methylene chloride, 1,2-dichloroethane, or a mixture thereof.

22. The method of claim 1, wherein the reaction is carried out in the substantial absence of an organic solvent.

23. The method of claim 1, wherein the reaction is carried out at 50° C. to 60° C. for a period of time from about 4 hours to about 8 hours.

24. The method of claim 1, wherein the nitric acid and the sulfuric acid are premixed before being mixed with the styrenic fluoropolymer.

25. The method of claim 24, wherein the premixed nitric acid and sulfuric acid is added to and mixed with the styrenic fluoropolymer over a period of time ranging from 30 minutes to 3 hours.

26. The method of claim 1, wherein the styrenic fluoropolymer is a copolymer of $\alpha,\beta,\beta$-trifluorostyrene with one or more ethylenically unsaturated monomers selected from the group consisting of styrene, methyl acrylate, methyl methacrylate, butyl acrylate, butyl methacrylate, 2-ethylhexyl acrylate, acrylic acid, methacrylic acid, $\alpha$-methyl styrene, 4-methylstyrene, vinyl biphenyl, acrylonitrile, and isoprene.

* * * * *